US008151256B2

(12) United States Patent
Ramannavar et al.

(10) Patent No.: US 8,151,256 B2
(45) Date of Patent: Apr. 3, 2012

(54) PLATFORM INDEPENDENT REGISTRY FRAMEWORK

(75) Inventors: Nitin R. Ramannavar, Sunnyvale, CA (US); Prabhat Laxminarayan Hegde, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 1099 days.

(21) Appl. No.: 12/023,885

(22) Filed: Jan. 31, 2008

(65) Prior Publication Data
US 2009/0199173 A1 Aug. 6, 2009

(51) Int. Cl.
*G06F 9/44* (2006.01)
(52) U.S. Cl. ........ 717/168; 717/169; 717/170; 717/171; 717/175; 717/176; 717/147
(58) Field of Classification Search .................. 345/156; 717/168–171, 175–176, 147
See application file for complete search history.

(56) References Cited

U.S. PATENT DOCUMENTS

| 2004/0268293 | A1* | 12/2004 | Woodgeard | 717/101 |
|---|---|---|---|---|
| 2006/0176271 | A1* | 8/2006 | Polivy et al. | 345/156 |
| 2008/0127089 | A1* | 5/2008 | Peretz et al. | 717/122 |
| 2009/0113407 | A1* | 4/2009 | Sedukhin et al. | 717/168 |

* cited by examiner

*Primary Examiner* — Don Wong
*Assistant Examiner* — Lynda Dinh
(74) *Attorney, Agent, or Firm* — Osha • Liang LLP (57) ABSTRACT

A method for managing a software application. The method involves receiving an abstract API command to perform a life cycle operation (LCO) on a target system, where the LCO identifies the software application, where the software application is associated with a software application schema, and where the target system is associated with a platform independent registry, determining whether the LCO is compatible with the target system using the software application schema and the platform independent registry, where the LCO is compatible with the target system; mapping the abstract API command to an operating system (OS)-specific command for performing the LCO, where the OS-specific command is associated with an OS executing on the target system; executing the OS-specific API command to perform the LCO on the target system to obtain a result; and updating the platform independent registry based on the result.

14 Claims, 6 Drawing Sheets

PLATFORM INDEPENDENT REGISTRY FRAMEWORK

BACKGROUND

Software applications need to be managed and maintained over the course of their use. Managing software applications may include, for example, auditing the usage of the software application. Further, maintaining a software application may include, for example, installing a new security patch for the software application. Operations used to manage and maintain software applications may be referred to as lifecycle operations (LCOs).

Software applications are deployed on many different types of systems, where each system may include a different set of hardware components and software components and/or a different set of configurations for one or more of the aforementioned components. As such, performing a LCO on or for a software application includes an understanding of the system on which the software application is executing. This information is necessary in order to properly perform the LCO. Further, an administrator of the system must understand the underlying system upon which the software application is executing in order to properly perform the LCO. If the administrator is managing and/or maintaining several different systems, the administrator must maintain or have knowledge of each system in order to properly perform the LCOs on each system.

SUMMARY

In general, in one aspect, the invention relates to a method for managing a software application. The method including: receiving an abstract API command to perform a life cycle operation (LCO) on a target system, where the LCO identifies the software application, where the software application is associated with a software application schema, and where the target system is associated with a platform independent registry, determining whether the LCO is compatible with the target system using the software application schema and the platform independent registry, where the LCO is compatible with the target system; mapping the abstract API command to an operating system (OS)-specific command for performing the LCO, where the OS-specific command is associated with an OS executing on the target system; executing the OS-specific API command to perform the LCO on the target system to obtain a result; and updating the platform independent registry based on the result.

In general, in one aspect, the invention relates to a registry framework for managing a software application, including: a data repository including: a software application schema associated with the software application; and a platform independent registry associated with a target system; an operating system (OS) map for the target system configured to provide a mapping of abstract API commands to OS-specific API commands, where the OS-specific API commands are associated with an OS executing on the target system; a user interface comprising functionality to: receive one of the abstract API commands to perform a life cycle operation (LCO) on the target system, where the LCO identifies the software application; an operation engine comprising functionality to: determine whether the LCO is compatible with the target system using the software application schema and the platform independent registry; responsive to the LCO being compatible with the target system: map the one of the abstract API commands to one of the OS-specific API commands using the OS map; execute the one of the OS-specific API commands to perform the LCO on the target system to obtain a result; and update the platform independent registry based on the result.

In general, in one aspect, the invention relates to a computer readable medium comprising instructions for managing a software application, the instructions comprising functionality for: receiving an abstract API command to perform a life cycle operation (LCO) on a target system, where the LCO identifies the software application, where the software application is associated with metadata comprised in a software application schema, and where the target system is associated with metadata comprised in a platform independent registry, determining whether the LCO is compatible with the target system using the software application schema and the platform independent registry, where the LCO is compatible with the target system; mapping the abstract API command to an operating system (OS)-specific command to perform the LCO, where the OS-specific command is associated with an OS executing on the target system; execute OS-specific API command to perform the LCO on the target system to obtain a result; and update the platform independent registry based on the result.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a platform independent framework for managing software applications. Specifically, embodiments of the invention provide a platform independent framework for performing a life cycle operation (LCO) associated with the software application by mapping an abstract API command to an operating system (OS)-specific command for execution of the LCO.

In one embodiment of the invention, a LCO corresponds to any action used to manage and/or maintain a software application. Examples of LCOs include, but are not limited to, initial installation, version upgrades, security and functionality updates, management (e.g., start, stop, and suspend), auditing, and un-installation.

In one embodiment of the invention, the platform independent framework includes functionality to: (1) determine whether a LCO is compatible with a target system, (2) map an abstract API command for performing the LCO to an OS-specific API command for performing the LCO, and (3)

execute the LCO on the target system. Additional details of the platform independent framework are discussed below.

Figure 1A:
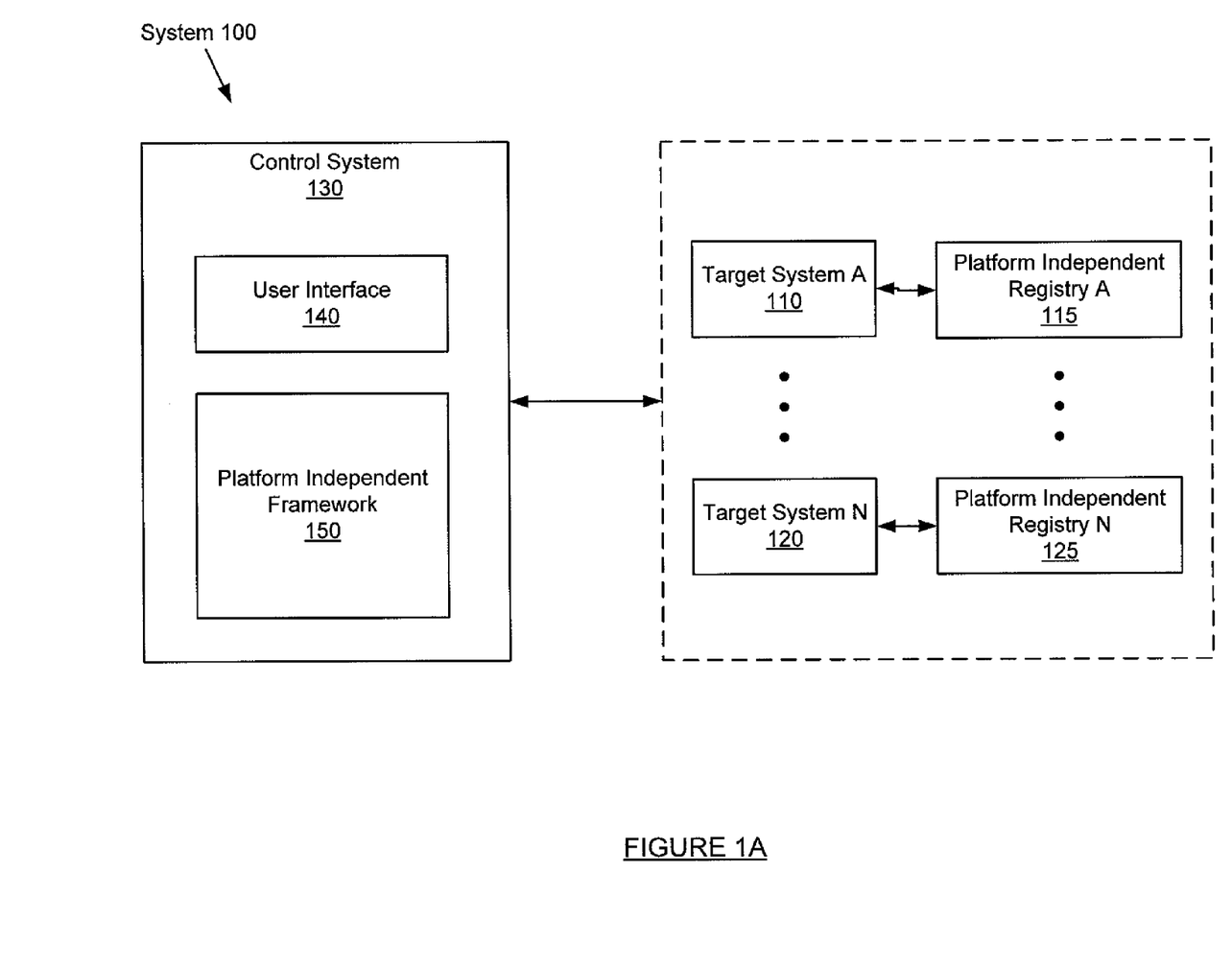
FIGS. 1A and 1B show a system in accordance with one or more embodiments of the invention.

FIG. 1A shows a system (100) in accordance with one or more embodiments of the invention. As shown in FIG. 1A, the system (100) includes a control system (130) and one or more target systems (e.g., target system A (110) and target system N (120)). Each of the target systems is associated with a platform independent registry (e.g., platform independent registry A (115) and platform independent registry N (115)). Each of these components is described below and may be located on the same device (e.g., a server, mainframe, desktop personal computer (PC), laptop, personal desktop assistant (PDA), mobile device, or other computing devices) or may be located on separate devices coupled by a network (e.g., Internet, Intranet, Extranet, Local Area Network (LAN), Wide Area Network (WAN), or other network communication methods), with wire and/or wireless segments.

In one or more embodiments of the invention, the target system (e.g., target system A (110) and target system N (120)) corresponds to any system configured to execute an operating system (OS) on which a LCO may be performed. At the time the LCO is executed, one or more applications may already be stored in the target system. Alternatively, the target system may be a new system and, as such, not include any installed software applications at the time the LCO is executed. Accordingly, the target system may involve the execution of a LCO before installation (including actual installation) and/or post-installation of an associated software application on the target system.

In one or more embodiments of the invention, the platform independent registry (e.g., platform independent registry A (115) and platform independent registry N (125)) includes metadata associated with the corresponding target system (e.g., target system A (110) and target system N (120)). For example, the platform independent registry may include the system configuration of a corresponding target system including, but not limited to, hardware components (e.g., motherboard, memory, processor, peripherals or any other physical component in/connected to the system), software components (e.g., operating system information, software application information, etc.), system resource usage, system interdependency lists, system availability, historical system use, current system use, future/planned system use, system functionality, system efficiency, system costs, or any other attributes of the target system. The platform independent registry may be located within the control system (130), may be maintained on a corresponding target system, or may be stored in another suitable data repository.

In one or more embodiments of the invention, the control system (130) corresponds to a process, program, or system that uses the platform independent framework (150) to perform (or initiate the performance of) a LCO on a target system (e.g., target system A (110) and target system N (120)). In one or more embodiments of the invention, the control system (130) is implemented using a client-server topology. The control system (130) may correspond to an enterprise application executing on a server, a distributed application executing on a set of systems, or an application executing on a personal computer. In one embodiment of the invention, the control system (130) is accessible from other systems using one or more interfaces (e.g. user interface (140), web portals (not shown), or any other tool to access the control system (130)). In one or more embodiments of the invention, the control system (130) is accessible over a network connection (not shown), such as the Internet, by one or more users. Information and/or services provided by the control system (130) may be stored and accessed over the network connection.

Continuing with FIG. 1A, the user interface (140) corresponds to one or more interfaces adapted to enable access to the control system (130) and any services provided by the control system (130) in accordance with one or more embodiments of the invention. The user interface (140) may be a web interface, a graphical user interface (GUI), a command line interface, an application interface, another suitable interface or any combination thereof. The user interface (140) may include one or more web pages that may be accessed from a computer with a web browser and/or internet connection.

The user interface (140) may include functionality to obtain, modify, and/or delete different components within the control system (130) and/or the target systems (110, 120). Specifically, the user interface (140) may be used to interact with the platform independent framework (150) to perform a LCO on a target system. For example, the user interface (140) may include functionality to obtain a LCO command from a user. In another example, the user interface (140) may enable a user to modify the platform independent registry (115, 125) including data stored therein (discussed below).

Figure 1B:
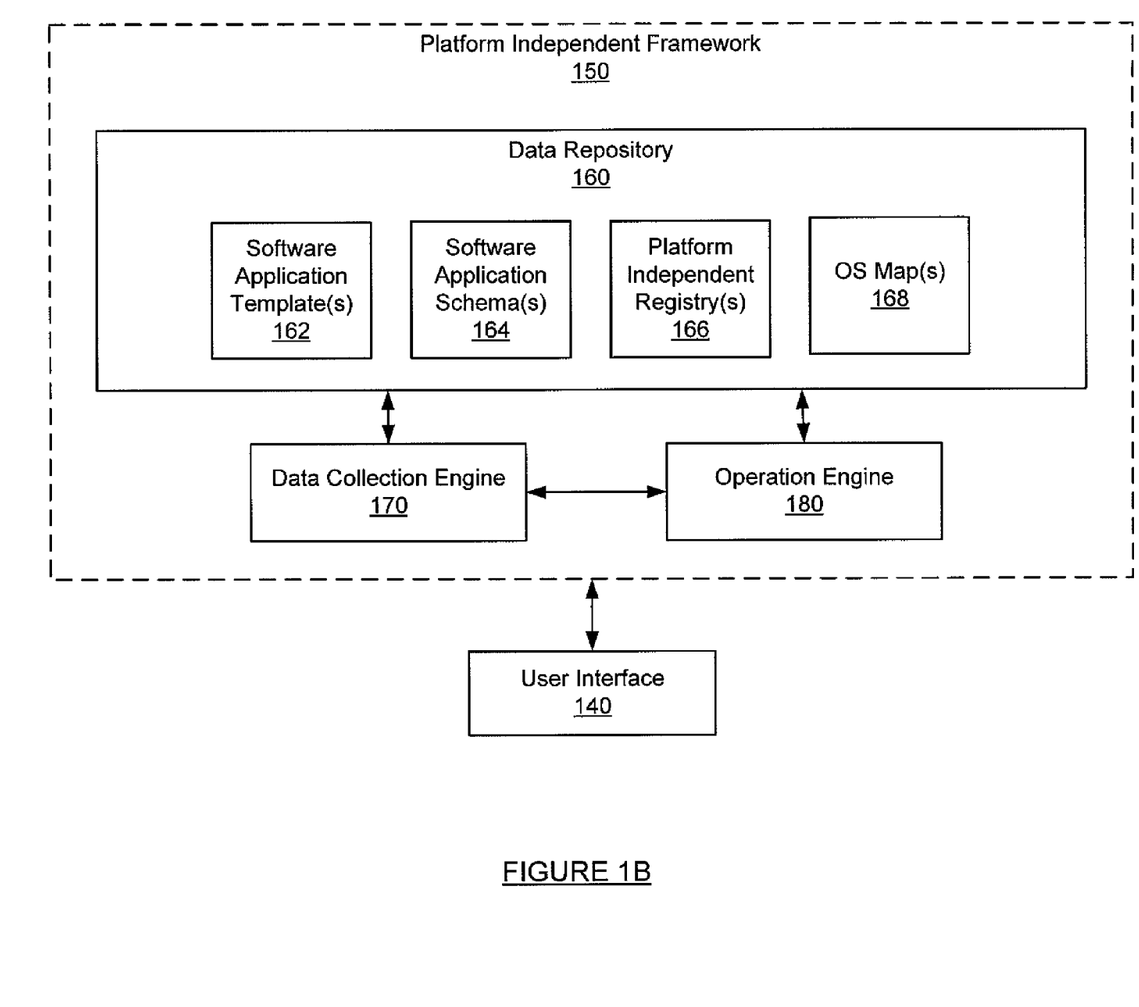

FIG. 1B shows a platform independent framework in accordance with one embodiment of the invention. As shown in FIG. 1B, the platform independent framework (150) includes a data repository (160), a data collection engine (170), and an operation engine (180). The components within the platform independent framework (150) may be distributed, as described above, within the system (100).

In one or more embodiments of the invention, the data repository (160) includes functionality to store a software application template(s) (162), a software application schema(s) (164), a platform independent registry(s) (166), and an operating system (OS) map(s) (168). In one or more embodiments of the invention, access to the data repository (160) is restricted and/or secured. As such, access to the data repository (160) may require authentication using passwords, secret questions, personal identification numbers (PINs), biometrics, and/or any other suitable authentication mechanism. Those skilled in the art will appreciate that elements or various portions of data stored in the data repository (160) may be distributed and stored in multiple data repositories. In one or more embodiments of the invention, the data in the data repository (160) is organized in a flat file, a hierarchical data structure, a relational database, or another suitable data structure. For example, the data repository (160) may be maintained as a table of a Structured Query Language (SQL) database. In addition, data in the data repository (160) may be verified against data stored in other repositories.

In one or more embodiments of the invention, the software application template(s) (162) is stored in the data repository (160). In one embodiment of the invention, the software application template(s) (162) corresponds to a template that includes a number of modifiable and/or configurable fields associated with a software application (not shown). For example, fields within the software application template may correspond to memory requirements, patch requirements, processor speed, OS requirements, hardware support, a list of updates, enabled components, security levels, or any other field which may correspond to one or more attributes associated with the software application. The software application template (162) may correspond to a generic template for use with any software application, or may be specific to a particular group of software applications. The software application template (162) may be customized according to one or more software applications by including fields specifically related to the software application. For example, a field within a software application template associated with a word processing tool may correspond to "available fonts." The software application template (162) may be created and/or modified after the software application has been deployed. For example, if an updated version of the software application includes new configurable settings, the software application template may be modified to include these settings in the list of modifiable or configurable attributes associated with the software application. The software application template (162) may be provided by a software developer, may be generated by a data collection engine (170), or may by provided by any other entity.

In one or more embodiments of the invention, a software application schema (164) corresponds to a software application template (162) populated with data for at least one field in the software application template (162). For example, the software application schema (164) may indicate the actual memory requirements and/or OS requirements of a software application. The software application schema (164) may include a history of different modifications or configurations associated with the software application. For example, the software application schema may list all the patches installed with the software application, and/or a list of patches still required for the software application to function correctly. The software application schema (164) may include any data related to components, settings, configurations, modifications, requirements, security issues, audits, software life cycle events and/or relevant data associated with a software application. The software application schema (164) may include any services provided by the software application, and the state of one or more services (e.g., installed, uninstalled, configured, stopped, active, bad or another state).

Example 1 is an example of a software application schema. Those skilled in the art will appreciate that the following schema is provided for exemplary purposes only and accordingly should not be construed as limiting the scope of the invention in any way.

Example 1: Software Application Schema implemented in XML

```
<!--
       ********Software Schema********
-->
<!-- Software Requirements -->
<xs:complexType name="SoftwareReq">
    <xs:sequence>
        <xs:element name="Hardware" type="Hardware"/>
        <xs:element name="OS" type="OS"/>
        <xs:element name="PhyMemory" type="xs:positiveInteger"/>
        <xs:element name="HDDMemory" type="xs:positiveInteger"/>
        <xs:element name="IP" minOccurs="1" type="IPAddress"/>
        <xs:element name="Interfaces" minOccurs="1" type="IPAddress"/>
        <xs:element name="Patches" minOccurs="0" type="xs:string"/>
    </xs:sequence>
</xs:complexType>
<!-- Software Components -->
<xs:complexType name="Software">
    <xs:sequence>
        <xs:element name="Name" type="xs:string" use="required" />
        <xs:element name="DisplayName" use="required" />
        <xs:element name="Path" type="xs:string" use="required" />
        <xs:element name="UserName" type="xs:string" use="optional" />
        <xs:element name="Password" type="xs:string" use="optional" />
        <xs:element name="StartupOnBootup" use="required" />
        <xs:element name="SoftwareReq" type="xs:SoftwareReq" />
        <xs:element name="Dependencies" minOccurs="0"/>
```

Example 1: Software Application Schema implemented in XML

```
    </xs:sequence>
</xs:complexType>
<!-- Software Base Service Definition -->
<xs:complexType name="Service">
    <xs:sequence>
        <xs:element name="ServiceName" type="xs:string"/>
        <xs:element name="ServiceDisplayName" type="xs:string"/>
        <xs:element name="ServicePath" type="xs:string"/>
        <xs:element name="ServiceVersion" type="xs:integer"/>
        <xs:element name="ServiceUserName" type="xs:string"/>
        <xs:element name="ServicePassword" type="xs:string"/>
        <xs:element name="StartupOnBootup" use="required"/>
        <xs:element name="ServiceState" type="ServiceState"/>
        <!-- List Products (Service Providers) -->
        <xs:element name="Software" minOccurs="1" type="Software"/>
    </xs:sequence>
</xs:complexType>
<!-- Software Service State -->
<xs:simpleType name="ServiceState">
    <xs:restriction base="xs:string">
        <xs:enumeration value="Installed"/>
        <xs:enumeration value="Uninstalled"/>
        <xs:enumeration value="Cofigured"/>
        <xs:enumeration value="Active"/>
        <xs:enumeration value="Stopped"/>
        <xs:enumeration value="Bad"/>
    </xs:restriction>
</xs:simpleType>
```

Continuing with FIG. 1B, in one embodiment of the invention, the platform independent registry (166), is stored in the data repository (160). The platform independent registry (166) corresponds to a registry describing a target system. The platform independent registry (166) may include descriptions of hardware components and/or software components of a target system including, but not limited to, configuration, requirements, availability, services, management, environment history, security issues, audits, interdependencies, and other suitable information. In one or more embodiments of the invention, the platform independent registry (166) is implemented in an extensible markup language (XML). Accordingly, the platform independent registry (166) may be accessed, modified, interpreted using various different hardware and/or software platforms.

Example 2 is an example of a platform independent registry implemented in XML for a server. Those skilled in the art will appreciate that the following platform independent registry is provided for exemplary purposes only and accordingly should not be construed as limiting the scope of the invention in any way.

Example 2: Platform Independent Registry implemented in XML for a server

```
<!--Shared Services -->
<xs:complexType name="SharedServices">
    <xs:complexContent>
        <xs:extension base="Service">
            <xs:sequence>
                <!-- Insert Shared Services Specific information here -->
                <xs:element name="xxx" type="xs:string"/>
            </xs:sequence>
        </xs:extension>
    </xs:complexContent>
</xs:complexType>
<!--Availability -->
<xs:complexType name="Availability">
    <xs:complexContent>
        <xs:extension base="Service">
```

Example 2: Platform Independent Registry
implemented in XML for a server

```xml
    <xs:sequence>
        <!-- Insert Service Specific information here -->
        <xs:element name="xxx" type="xs:string"/>
    </xs:sequence>
    </xs:extension>
    </xs:complexContent>
</xs:complexType>
<!--Provisioning -->
<xs:complexType name="Provisioning">
    <xs:complexContent>
    <xs:extension base="Service">
        <xs:sequence>
        <!-- Insert Service Specific information here -->
        <xs:element name="xxx" type="xs:string"/>
        </xs:sequence>
    </xs:extension>
    </xs:complexContent>
</xs:complexType>
<!--Management -->
<xs:complexType name="Management">
    <xs:complexContent>
    <xs:extension base="Service">
        <xs:sequence>
        <!-- Insert Service Specific information here -->
        <xs:element name="xxx" type="xs:string"/>
        </xs:sequence>
    </xs:extension>
    </xs:complexContent>
</xs:complexType>
<!-- Host Environment -->
<xs:element name="Environment">
    <xs:complexType>
        <xs:sequence>
        <xs:element name="Host" type="HostInfo"/>
        <xs:element name="IPPProduct">
            <xs:complexType>
                <xs:sequence>
                <xs:element ref="Baseinfo"/>
                <xs:element ref="Description"/>
                <xs:element name="Version" type="VersionType"/>
                <xs:element name="MediaDirectory"
                    type="MediaDirectoryType" minOccurs="0" />
                <xs:element name="Dependencies"
                    type="DependenciesType"/>
                </xs:sequence>
            </xs:complexType>
        </xs:element>
        <!-- Shared Services -->
        <xs:element name="IPPSharedServices"
            type="SharedServices"/>
        <!-- Availability Service -->
        <xs:element name="IPPAvailability" type="Availability"/>
        <xs:element name="SunCluster"
            substitutionGroup="Availability"/>
        <!-- Provisioning Service -->
        <xs:element name="IPPProvisioning" type="Provisioning"/>
        <xs:element name="IPPProvisioning"
            substitutionGroup="N1SPS"/>
        <!-- Management Service -->
        <xs:element name="IPPManagement" type="Management"/>
        <xs:element name="IPPManagement"
            substitutionGroup="N1SM"/>
        </xs:sequence>
    </xs:complexType>
</xs:element>
<xs:element name="Baseinfo">
    <xs:complexType>
        <xs:attribute name="id" type="xs:string" use="required"/>
        <xs:attribute name="name" type="xs:string" use="required"/>
        <xs:attribute name="upgradeSupported" type="xs:boolean"
            use="optional" default="false"/>
        <xs:attribute name="LocalzoneSupport" type="xs:boolean"
            use="optional" default="true"/>
        <xs:attribute name="SparsezoneSupport" type="xs:boolean"
            use="optional" default="true"/>
        <xs:attribute name="enduserVisible" type="xs:boolean"
            use="required"/>
```

Example 2: Platform Independent Registry
implemented in XML for a server

```xml
    </xs:complexType>
</xs:element>
<xs:complexType name="VersionType">
    <xs:sequence>
        <xs:element name="DesignatedUnits"
            type="DesignatedUnitsType" minOccurs="0" maxOccurs="1"/>
        <xs:element name="VersionInfo" type="VersionInfoType"
            minOccurs="1" maxOccurs="unbounded"/>
    </xs:sequence>
</xs:complexType>
<xs:complexType name="DesignatedUnitsType">
    <xs:sequence>
        <xs:element name="DesignatedUnit" type="DesignatedUnitType"
            minOccurs="0" maxOccurs="unbounded"/>
    </xs:sequence>
    <xs:attribute name="units" type="xs:string" use="required"/>
</xs:complexType>
<xs:complexType name="DesignatedUnitType">
    <xs:attribute name="name" type="xs:string" use="required"/>
    <xs:attribute name="version" type="xs:string" use="required"/>
    <xs:attribute name="os_arch" type="xs:string" use="optional"/>
    <xs:attribute name="os_version" type="xs:string" use="optional"/>
</xs:complexType>
<xs:complexType name="DependenciesType">
    <xs:sequence>
        <xs:element ref="Patches" minOccurs="0"
            maxOccurs="unbounded"/>
        <xs:element ref="Packages" minOccurs="0"
            maxOccurs="unbounded"/>
        <xs:element ref="FileUnits" minOccurs="0"
            maxOccurs="unbounded"/>
        <xs:element ref="RAM" minOccurs="0" maxOccurs="1"/>
        <xs:element ref="Swap" minOccurs="0" maxOccurs="1"/>
        <xs:element name="LowestUpgradeableVersion"
            type="LowestUpgradeableVersionType"/>
        <xs:element name="ForwardDependencies"
            type="ForwardDependenciesType"/>
    </xs:sequence>
</xs:complexType>
<!--Management -->
<xs:complexType name="Management">
    <xs:complexContent>
    <xs:extension base="Service">
        <xs:sequence>
        <!-- Insert Service Specific information here -->
        <xs:element name="xxx" type="xs:string"/>
        </xs:sequence>
    </xs:extension>
    </xs:complexContent>
</xs:complexType>
<!-- Host Environment -->
<xs:element name="Environment">
    <xs:complexType>
        <xs:sequence>
        <xs:element name="Host" type="HostInfo"/>
        <!--IPP Services -->
        <!-- Shared Services -->
        <xs:element name="IPPSharedServices"
            type="SharedServices"/>
        <!-- Availability Service -->
        <xs:element name="IPPAvailability"
            type="Availability"/>
        <xs:element name="SunCluster"
            substitutionGroup="IPPAvailability"/>
        <!-- Provisioning Service -->
        <xs:element name="IPPProvisioning"
            type="Provisioning"/>
        <xs:element name="IPPProvisioning"
            substitutionGroup="N1SPS"/>
        <!-- Management Service -->
        <xs:element name="IPPManagement" type="Management"/>
```

-continued

Example 2: Platform Independent Registry
implemented in XML for a server

```
        <xs:element name="IPPManagement"
        substitutionGroup="N1SM"/>
            </xs:sequence>
    </xs:complexType>
</xs:element>
```

In one or more embodiments of the invention, the OS map(s) (168) is stored in the data repository (160). In one embodiment of the invention, the OS map (168) provides a mapping between an abstract application programming interface (API) to one or more OS-specific APIs. The abstract API may include classes (including components such as, but not limited to, variables, constants, constructors, and methods) and/or any other data structures associated with executing a LCO. The mapping from an abstract API to one or more OS-specific APIs may involve a translation of a generic term and/or command to an OS-specific term and/or command, respectively. In one embodiment of the invention, the LCO is implemented by one or more abstract APIs.

Example 3 is an example of an OS map implemented in XML. In this example, an abstract API is mapped to Solaris 10U1 API, Solaris 10U2 API, and Linux API. Those skilled in the art will appreciate that the following OS map is provided for exemplary purposes only and accordingly should not be construed as limiting the scope of the invention in any way.

Example 3: OS MAP implemented in XML

```
<?xml version="1.0" encoding="ISO-8859-1" ?>
<xs:schema xmlns:xs="http://www.w3.org/2001/XMLSchema">
<!--
********Hardware, OS and Host Schema********
-->
<!-- datatypes -->
<xs:simpleType name="IPAddress">
    <xs:restriction base="xs:string">
        <xs:pattern value="[0-9].[0-9].[0-9].[0-9]"/>
    </xs:restriction>
</xs:simpleType>
<!-- OS Types -->
<xs:simpleType name="OS">
    <xs:restriction base="xs:string">
        <xs:enumeration value="Solaris 10U1"/>
        <xs:enumeration value="Solaris 10U2"/>
        <xs:enumeration value="Linux"/>
    </xs:restriction>
</xs:simpleType>
<!-- Hardware Types -->
<xs:simpleType name="Hardware">
    <xs:restriction base="xs:string">
        <xs:enumeration value="V210"/>
        <xs:enumeration value="240"/>
        <xs:enumeration value="T2000"/>
    </xs:restriction>
</xs:simpleType>
<xs:complexType name="RAMType">
    <xs:attribute name="minimum_in_MB" type="xs:string"
use="optional"/>
</xs:complexType>
<xs:complexType name="SwapType">
    <xs:attribute name="minimum_in_MB" type="xs:string"
use="optional"/>
</xs:complexType>
<!-- Host Definition -->
<xs:complexType name="HostInfo">
    <xs:sequence>
        <xs:element name="Hostname" type="xs:string"/>
        <xs:element name="State" type="State"/>
        <xs:element name="Hardware" type="Hardware"/>
```

-continued

Example 3: OS MAP implemented in XML

```
        <xs:element name="OS" type="OS"/>
        <xs:element name="RAM" type="RAMType"/>
        <xs:element name="Swap" type="SwapType"/>
        <xs:element name="HDDMemory" minOccurs="1"
maxOccurs="unbounded" type="xs:positiveInteger"/>
        <xs:element name="IP" minOccurs="1" maxOccurs="unbounded"
type="IPAddress"/>
        <xs:element name="Interfaces" minOccurs="1"
maxOccurs="unbounded" type="IPAddress"/>
    </xs:sequence>
</xs:complexType>
<!-- Host State -->
<xs:simpleType name="State">
    <xs:restriction base="xs:string">
        <xs:enumeration value="Installed"/>
        <xs:enumeration value="Uninstalled"/>
        <xs:enumeration value="Configured"/>
        <xs:enumeration value="Bad"/>
    </xs:restriction>
</xs:simpleType>
```

The OS map(s) (168) may be implemented in any format, generated as needed, or generated ahead of time and stored in a data repository (e.g., data repository (160)). The OS map (168) may be provided by a user (e.g., via the user interface (140)).

In one or more embodiments of the invention, the data collection engine (170) corresponds to a process, program, or system that includes functionality to modify the platform independent registry (166) and/or populate at least one field of the software application template (162) in order to generate the software application schema(s) (164). Specifically, the data collection engine (170) may include functionality to search for data within any files associated with the software application and/or the target system, from the Internet (e.g., from a software developer's website, from a third party website, a general information website, etc.), by querying any database (e.g., data repository (160), software information databases, etc.), by actively monitoring a software application and/or target system for changes (e.g., monitoring LCOs that are performed), and/or communicating with the operation engine (180) (e.g., data entered directly by a user using interface (140) that is received by the operation engine (180)). The data collection engine (170) may include functionality to function in an automated state (e.g., periodic data collection) and/or a manual state (e.g., initiated by a user for each data collection cycle). In one or more embodiments of the invention, the data collection engine (170) may include functionality to query and/or test components to collect data. For example, the data collection engine may ping each module of a software application and determine if the expected response is received. Based on the response, the data collection engine may determine the operating status of the module.

Continuing with FIG. 1B, the operation engine (180) corresponds to a process, program, and/or system for managing a software application on a target system. The operation engine (180) may include functionality to obtain commands from an interface (e.g., user interface (140)) for performing a LCO and based on the command interact with the different components within the platform independent framework (110) to execute the LCO. For example, the operation engine (180) may communicate with the data collection engine (170) to obtain an updated software application schema (164) corresponding to the software application associated with a LCO. In addition, the operation engine (180) may communicate with the data collection engine (170) to obtain an updated platform independent registry (166) including a current configuration of the target system. In another embodiment of the invention, the operation engine (180) may access the software application schema (164) and/or the platform independent registry (166) directly from the data repository (160) without communicating with the data collection engine (170). The operation engine (180) may further include functionality to determine a post LCO-execution configuration of the target system using the platform independent registry (166), the LCO, and/or the software application schema (164) and determine whether a conflict and/or error exists in the post LCO-execution configuration. In another embodiment of the invention, the operation engine (180) may include functionality to compare different software application schemas (164) to determine whether execution of the LCO (e.g., installation or upgrade) will result in a conflict for system configuration.

In one or more embodiments of the invention, the operation engine (180) includes functionality to map an abstract API command for performing a LCO to a OS-specific API command for performing the LCO using the OS map (168). The operation engine (180) may translate the abstract API command in portions or as a whole. For example, abstract API method command may translate to an OS-specific method command. Another example may involve, translation of a LCO as a whole. For example, for a patch that modifies a software application may have a simple abstract API command such as "upgrade(patch_file, software_base_file, OS_resource_configuration_file)". In this case, the operation engine (180) may map each input parameter to a corresponding parameter for the OS on the target system and map the upgrade method to the corresponding method in the OS-specific API. The operation engine (180) may also include functionality to execute the OS-specific API command to perform the LCO on the target system.

Figure 2:
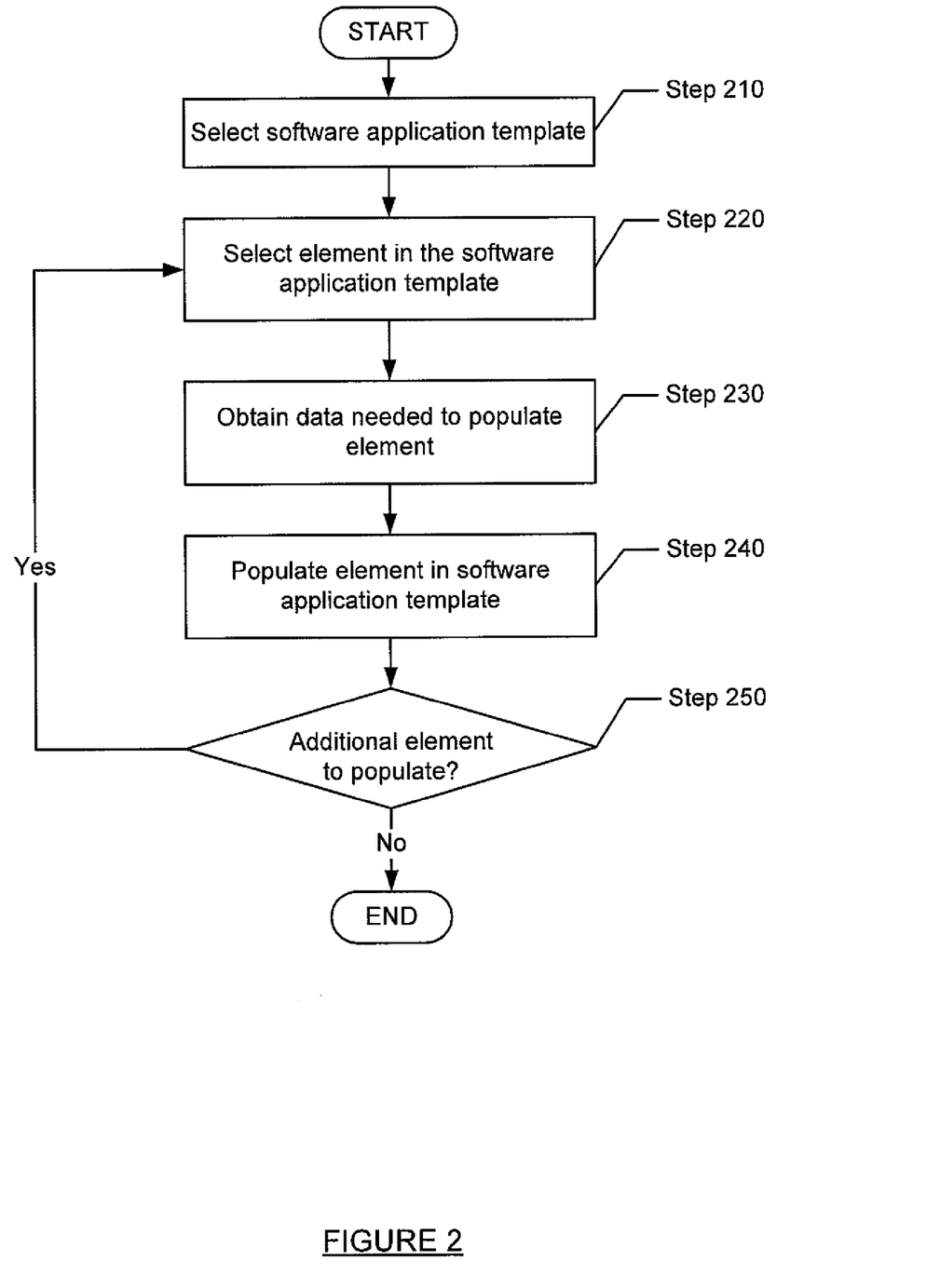
FIGS. 2-4 show flow charts in accordance with one or more embodiments of the invention.
Figure 3:
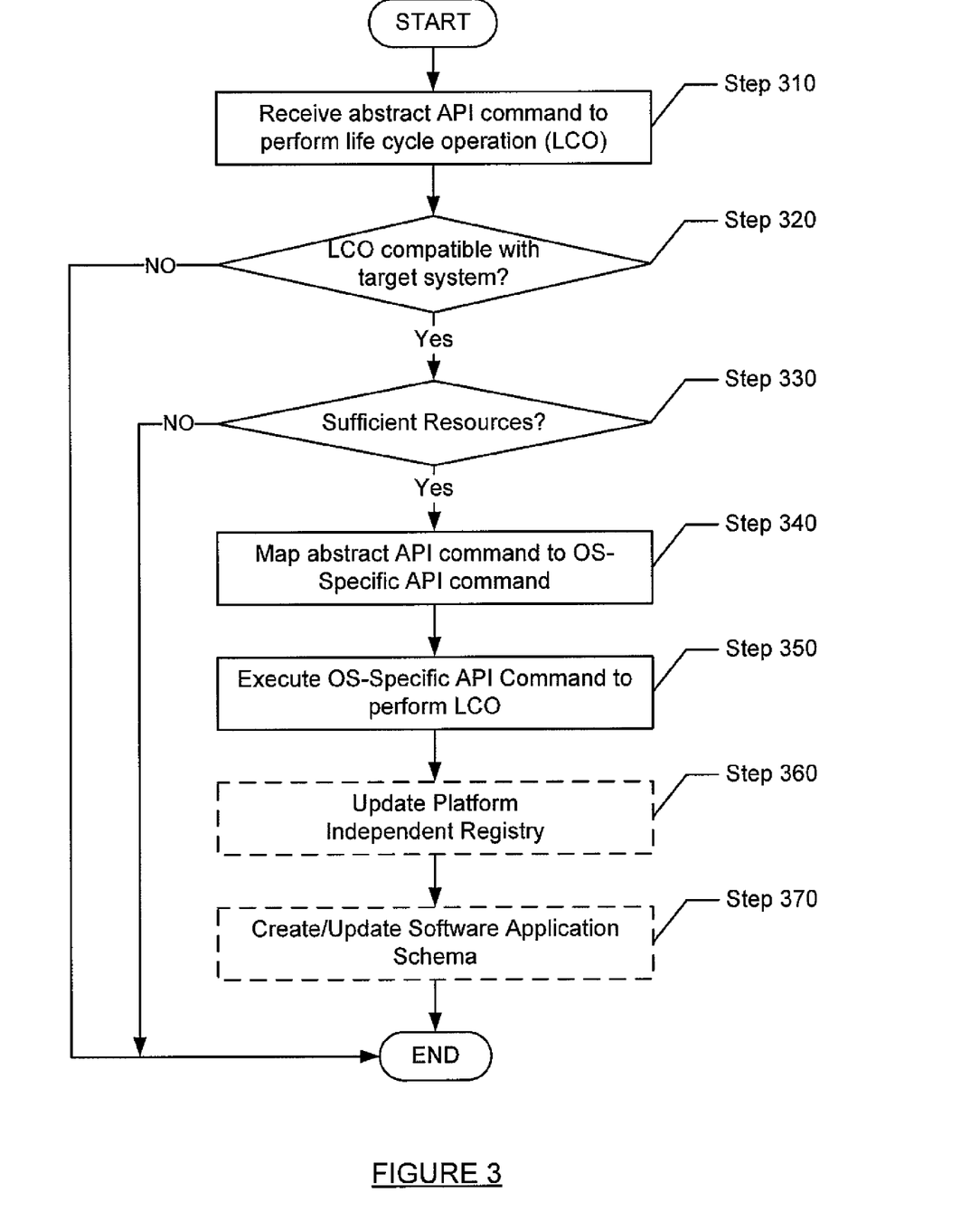

FIGS. 2 and 3 show flow charts in accordance with one or more embodiments of the invention. In one or more embodiments of the invention, one or more of the steps described below may be omitted, repeated, and/or performed in a different order. Accordingly, the specific arrangement of steps shown in FIGS. 2 and 3 should not be construed as limiting the scope of the invention.

Specifically, FIG. 2 shows a flow chart for generating a software application schema in accordance with one or more embodiments of the invention. In Step 210, a software application template is selected. A software application template may be selected from a collection of software application templates provided by a software developer, a third party entity, or currently available in the data repository (e.g., 160 in FIG. 2). The software application template may be modified and/or generated if a suitable software application template is not already available.

In Step 220, an element in the software application template is obtained in accordance with one or more embodiments of the invention. For example, the software application template may be read from a file, the input tokenized and a particular token selected. Another example may involve a document with user defined tags that identify elements within the software application schema (e.g., a software application template implemented in XML). As elements may be implemented at different levels (e.g., nested elements), a selection algorithm may be used to determine a sequence of element selection. Alternatively, for a simple software application template, elements may be selected based on the order they are listed in the software application template.

In Step 230, data to populate the element is obtained, in accordance with one or more embodiments of the invention. For example, metadata or other readily available data associated with the software application may be accessed to obtain data required to populate the element. The data associated with the software application may also be obtained directly from the software application by testing and/or querying the software application and/or query files related to the software application (e.g., a software configuration file). If the information is not available, the data may be obtained by searching and/or querying external sources.

In Step 240, the selected element is populated in the software application template using the data obtained in Step 230. In one embodiment of the invention, the template may be populated by directly modifying the original software application template, and/or generating a new software application template and replacing the prior software application template. For example, in a software application template implemented as an XML file, attribute values within an element may be modified. In addition, if attributes within an element are no longer applicable, the element may be replaced with an empty element tag or removed all together from the XML file. Furthermore, in one or more embodiments of the invention, external data may be incorporated into a software application template. For example, in an XML file, an XInclude function may be used to incorporate external references as part of the software application template.

In Step 250, a determination is made about whether to populate additional elements. The determination may be made based on the purpose of populating the software application template. For example, for a general purpose building of a schema, all elements within the software application template may be populated, whereas when data is being collected for the execution of a specific LCO, the specified and/or necessary elements to perform the LCO may be populated immediately and the remaining elements may be populated at a later time. When the elements selected within a software application template have been populated, the software application schema is complete. As described above, although all elements within the software application template may be populated to generate the software application schema, the partially complete software application template may be used as a software application schema.

FIG. 3 shows a process for performing a LCO in accordance with one or more embodiments of the invention. In Step 310, an abstract API command to perform a LCO is received. The abstract API command may be received directly from a user (e.g., a system administrator) or may be received from a process or program. For example, the abstract API command may be received from a scheduled maintenance program running on a control machine.

Figure 4:
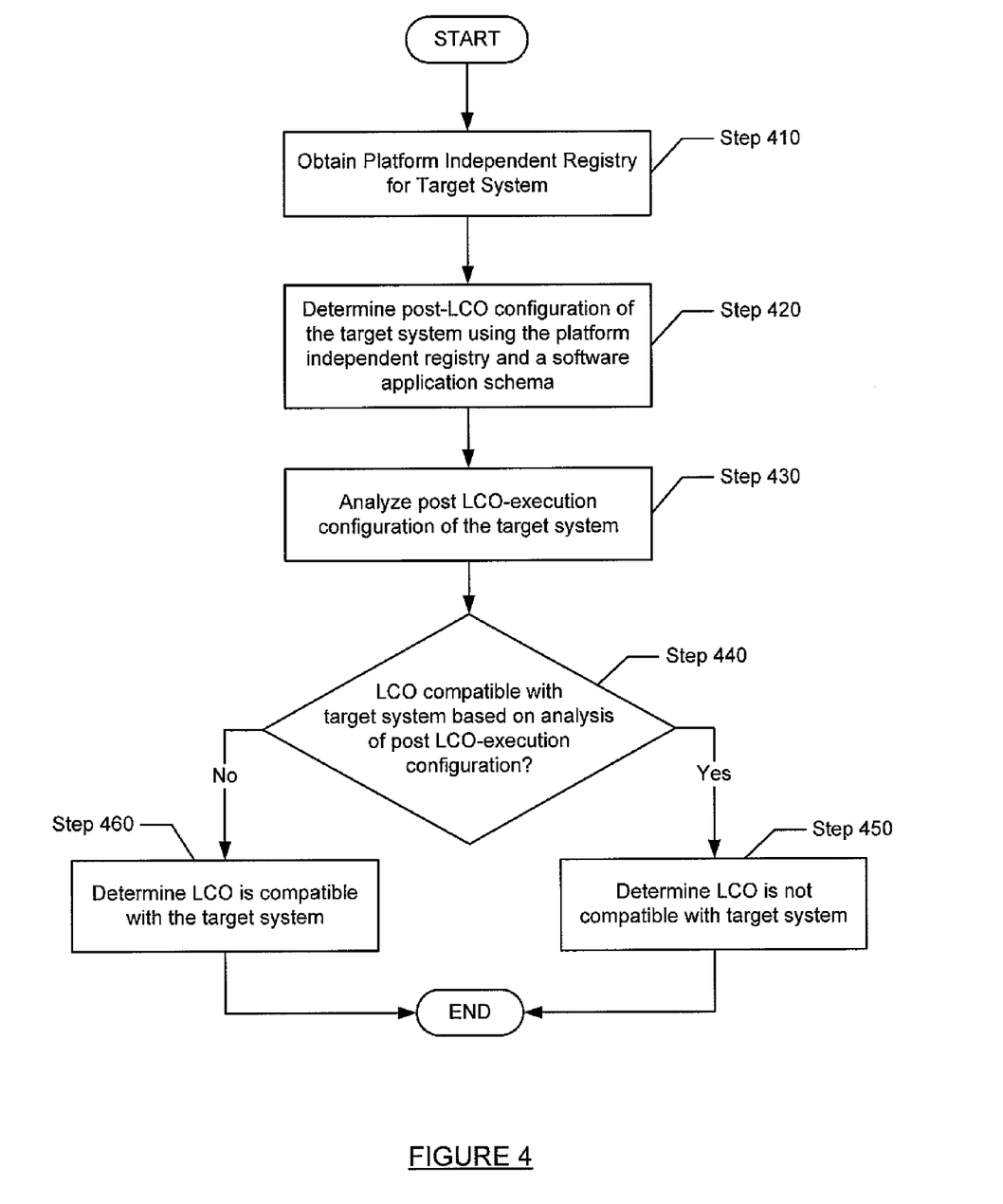

In Step 320, a determination is made whether the LCO associated with the abstract API command is compatible with the target system. FIG. 4 shows an exploded view of Step 320, detailing the steps involved in determining whether the LCO is compatible with the target system, in accordance with one or more embodiments of the invention. Referring to FIG. 4, in Step 410, a platform independent registry corresponding to the target system is obtained. The platform independent registry may be obtained from the target system or from an external source (e.g., a control system running outside the target system). If a platform independent registry is not available, a platform independent registry may be generated based on the target system (including components installed on the target system).

In Step 420, a post-LCO configuration of the target system and/or the platform independent registry is determined. In one embodiment of the invention, determining a post-LCO configuration may involve determining a single configuration and/or setting of the target system a file associated with the LCO. For example, for an install operation of a software application, the metadata associated with the software application may be interpreted to determine an OS start up setting. In another embodiment of the invention, determining a post-LCO configuration may involve determining some or all of the changes in the target system and/or a corresponding software application, that the execution of the LCO is anticipated to impact. For example, in a maintenance process, a software application may be modified by the installation of security patches that affect the methods in which the operating system can access the software application. Accordingly, the post-LCO configuration would involve the use of different OS methods for executing the software application.

In Step 430, the post-LCO configuration is analyzed. In one or more embodiments of the invention, the analysis may involve comparing the post-LCO configuration with a current configuration of the target system. For example, all the differences between the post-LCO configuration and the current configuration may be identified as potentially incompatible. For example, if a setting that is required by a software application in a current configuration of the target system conflicts with the post-LCO configuration of the target system, the LCO may be deemed to be incompatible with the target system. In another example, if the LCO includes the installation of a new software application, the interdependencies of previously installed software applications (e.g., based on metadata, software application schema, configurations and/or other suitable criteria) on the target system may be checked to ensure that the new software application is compatible with the existing software applications.

In Step 440, the results of the analysis in Step 430 are used to determine whether the post-LCO configuration is compatible with the target system, In Step 450, the LCO is determined to be incompatible with the target system and, as such, the LCO is not performed. Alternatively, in Step 460 the LCO is determined to be compatible with the target system. In one or more embodiments of the invention, the target system may also be modified based on priority. For example, if the LCO takes priority over a conflicting/incompatible previous configuration and/or software application, the previous configuration and/or software application may be modified or removed. In another embodiment of the invention, different configurations of the target system may be tested to identify a configuration that is compatible with the existing target system and with the LCO.

Returning to FIG. 3, in Step 330, if a LCO is determined to be compatible with the target system, the target system is checked to determine whether there are sufficient resources (e.g., memory, RAM, HDD, interface, shared storage, CPU) to support a post-LCO environment (i.e., the target system, including both hardware components and software applications, after the LCO has been performed). For example, if the LCO involves the installation of a new software application. The software application schema associated with the new software application may be checked to obtain system resource requirements and the platform independent registry may be checked to determine whether the target system has sufficient system resources for the resource requirements. In one or more embodiments of the invention, resources may be shared by different software applications and involve temporary suspension of one or more software applications for the execution of another software application. In this case, the system resources may be deemed sufficient as long as the software application can execute for at least a portion of the time in the post-LCO environment.

In Step 340, the abstract API command is mapped to an OS-specific API command. The abstract API command may be mapped to a single OS-specific API command or to multiple OS-specific API commands. Furthermore, the abstract API command may be mapped for OS-specific API commands corresponding to different software and hardware system configurations. In one embodiment of the invention, the mapping from the abstract API command to an OS-specific API command may be predetermined by a programmer and/or an administrator and accordingly, may already be readily available. In another embodiment of the invention, the mapping may be performed automatically by analyzing the abstract API based on a set of rules to generate a command in the OS-specific API that performs the same LCO.

In Step 350, the OS-specific API command is executed to perform the LCO on the target machine. The LCO may initiated using a remote interface (e.g., by the control system). The execution of the LCO may result in any modification to a configuration of a target system including but limited to installation, modification (e.g., maintenance, upgrade, suspension, restart), and un-installation of a software application.

In Step 360, the platform independent registry may be updated to reflect any changes in the target system after the execution of the LCO. For example, the updates may include different configurations of the operating system, different installed components on the target system, different resource usage, history of changes, and/or any other suitable updates. In Step 370, the software application schema corresponding to the software application associated with the LCO may also be updated. For example, the software application schema may be updated to include the modifications made to the software application, the current status of different modules of the software application, the issues encountered, the services provided, the usage of the software application, and/or any other suitable updates.

Figure 5:
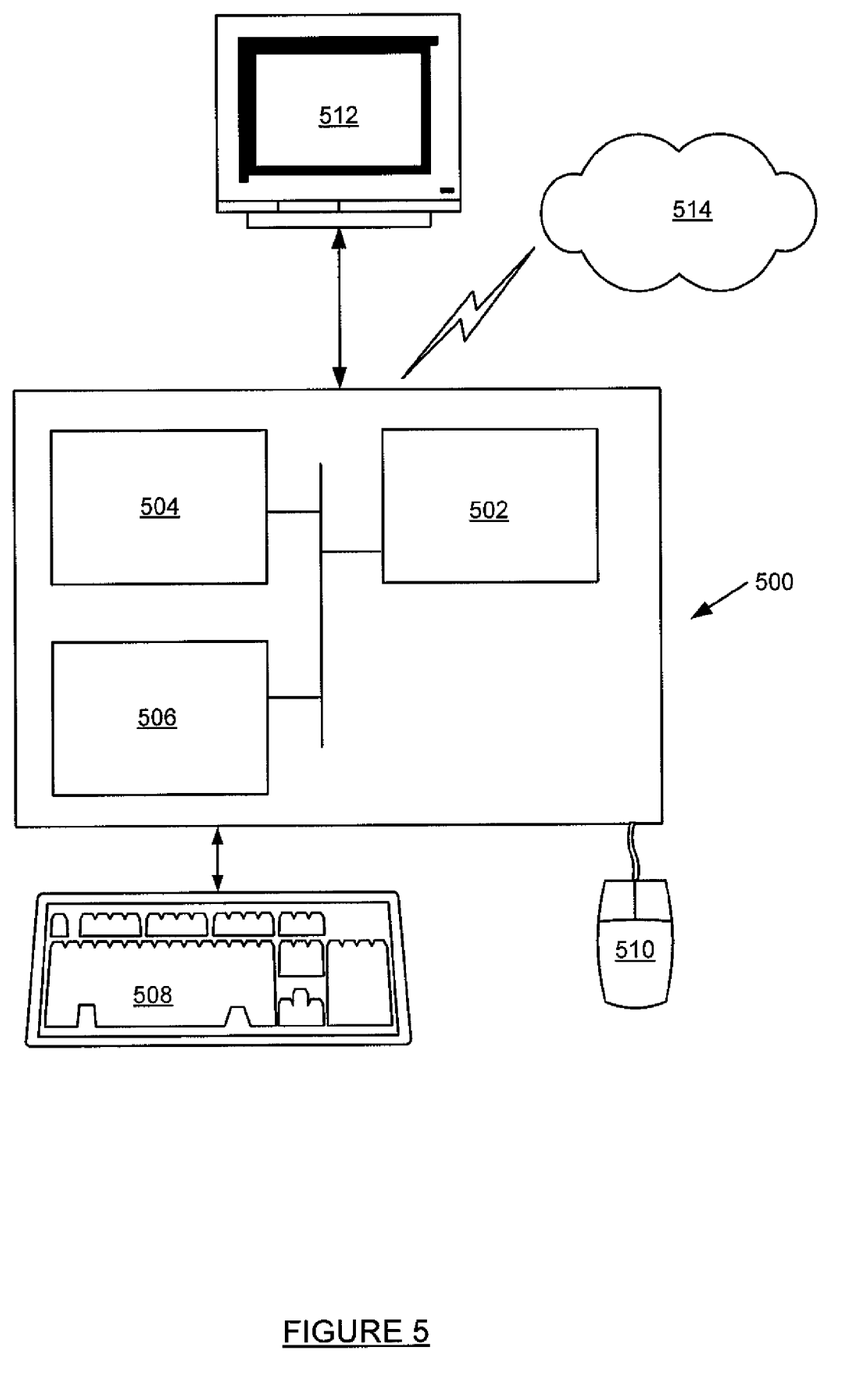
FIG. 5 shows a computer system in accordance with one or more embodiments of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may include input means, such as a keyboard (508) and a mouse (510), and output means, such as a monitor (512). The computer system (500) is connected to a LAN or a WAN (e.g., the Internet) (514) via a network interface connection. Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing a software application, comprising: receiving, by a control system, an abstract application programming interface (API) command to perform a life cycle operation (LCO) on a target system, wherein the LCO identifies the software application, and wherein the software application is associated with a software application schema,
   obtaining a platform independent registry associated with the target system, wherein the platform independent registry describes software components executing on the target system;
   generating a post-LCO configuration using the platform independent registry and the software application schema, wherein the post-LCO configuration comprises an anticipated impact of executing the LCO on the target system;
   comparing the post-LCO configuration to a current configuration of the target system;
   determining, based on the comparing, that the LCO is compatible with the target system;
   responsive to the LCO being compatible with the target system:
      obtaining an operating system (OS) map associated with an OS executing on the target system, wherein the OS map comprises a mapping between the abstract API command and an OS-specific API command for performing the LCO on the target system, wherein the abstract API command is mapped to a plurality of OS-specific API commands;
      executing, by the control system via a remote interface, the OS-specific API command to perform the LCO on the target system to obtain a result; and
      updating the platform independent registry based on the result.

2. The method of claim 1, further comprising:
   generating the software application schema based on metadata associated with the software application.

3. The method of claim 1, further comprising:
   updating the software application schema based on the result.

4. The method of claim 1, wherein the platform independent registry describes a hardware configuration of the target system.

5. The method of claim 4, wherein the platform independent registry and the software application schema are implemented in an extensible markup language (XML).

6. A registry framework for managing a software application, comprising:
   a data repository comprising:
      a software application schema associated with the software application; and
      a platform independent registry, wherein the platform independent registry describes software components executing on a target system;
      an operating system (OS) map for the target system configured to provide a mapping of a plurality of abstract application programming interface (API) commands to a plurality of OS-specific API commands, wherein the plurality of OS-specific API commands are associated with an OS executing on the target system;
   a user interface comprising functionality to:
      receive one of the plurality of abstract API commands to perform a life cycle operation (LCO) on the target system, wherein the LCO identifies the software application;
   an operation engine comprising functionality to:
      obtain the platform independent registry;
      generate a post-LCO configuration using the platform independent registry and the software application schema, wherein the post-LCO configuration comprises an anticipated impact of executing the LCO on the target system;
      comparing the post-LCO configuration to a current configuration of the target
      determine, based on the comparing, that the LCO is compatible with the target system;
      responsive to the LCO being compatible with the target system:
         obtain the OS map, wherein the OS map comprises a mapping between the abstract API command and an OS-specific API command for performing the LCO on the target system, wherein the abstract API command is mapped to a plurality of OS-specific API commands;
         execute, via a remote interface, the one of the plurality of OS-specific API commands to perform the LCO on the target system to obtain a result; and
         update the platform independent registry based on the result.

7. The registry framework of claim 6, wherein the platform independent registry describes a hardware configuration of the target system.

8. The registry framework of claim 7, wherein the platform independent registry and the software application schema are implemented in an extensible markup language (XML).

9. The registry framework of claim 6, wherein the operation engine further comprises functionality to:
   generate the software application schema based on metadata associated with the software application.

10. The registry framework of claim 6, wherein the operation engine further comprises functionality to update the software application schema based on the result.

11. A computer readable medium comprising instructions for managing a software application, the instructions comprising functionality for:
   receiving, by a control system, an abstract application programming interface (API) command to perform a life cycle operation (LCO) on a target system, wherein the LCO identifies the software application, and wherein the software application is associated with metadata comprised in a software application schema;
   obtaining a platform independent registry associated with the target system, wherein the platform independent registry comprises
metadata describing software components executing on the target system;
   generating a post-LCO configuration using the platform independent registry and the software application schema, wherein the post-LCO configuration comprises an anticipated impact of executing the LCO on the target system;
   comparing the post-LCO configuration to a current configuration of the target system;
   determining, based on the comparing, that the LCO is compatible with the target system;
responsive to the LCO being compatible with the target system:
   obtaining an operating system (OS) map associated with an OS executing on the target system, wherein the OS map comprises a mapping between the abstract API command and an OS-specific API command to perform the LCO on the target system, wherein the abstract API command is mapped to a plurality of OS-specific API commands;

executing, by the control system via a remote interface, the OS-specific API command to perform the LCO on the target system to obtain a result; and updating the platform independent registry based on the result.

12. The computer readable medium of claim 11, wherein the instructions further comprising functionality for updating the software application schema based on the result.

13. The computer readable medium of claim 11, wherein the platform independent registry describes a hardware configuration of the target system.

14. The computer readable medium of claim 13, wherein the platform independent registry and the software application schema are implemented in an extensible markup language (XML).

* * * * *